(12) United States Patent
Yang (10) Patent No.: US 8,880,717 B2
(45) Date of Patent: Nov. 4, 2014

(54) METHOD FOR CONTROLLING AN ELECTRONIC DEVICE TO OUTPUT ELECTRONIC CONTENT, AND ELECTRONIC DEVICE FOR PERFORMING THE METHOD

(76) Inventor: Jian-Meng Yang, Taipei (TW)

( * ) Notice: Subject to any disclaimer, the term of this patent is extended or adjusted under 35 U.S.C. 154(b) by 1009 days.

(21) Appl. No.: 12/849,736

(22) Filed: Aug. 3, 2010

(65) Prior Publication Data

US 2011/0035500 A1 Feb. 10, 2011

(30) Foreign Application Priority Data

Aug. 5, 2009 (TW) .............................. 98126355 A (51) Int. Cl.
| | |
|---|---|
| G06F 15/16 | (2006.01) |
| G06F 15/173 | (2006.01) |
| H04M 1/00 | (2006.01) |
| H04L 29/00 | (2006.01) |
| H04L 12/28 | (2006.01) |
| H04L 29/08 | (2006.01) |
| G06F 3/0486 | (2013.01) |
| H04M 1/725 | (2006.01) |

(52) U.S. Cl.
CPC ............... G06F 3/0486 (2013.01); H04M 1/00 (2013.01); H04L 29/00 (2013.01); H04L 12/2816 (2013.01); H04L 67/04 (2013.01); H04L 12/2803 (2013.01); H04M 1/7253 (2013.01); H04L 67/06 (2013.01)

USPC ............................ 709/231; 709/227; 709/239

(58) Field of Classification Search
USPC ........................................ 709/227, 231, 239
See application file for complete search history.

(56) References Cited

U.S. PATENT DOCUMENTS

| | | | | |
|---|---|---|---|---|
| 6,499,062 | B1 * | 12/2002 | Shteyn | 719/315 |
| 8,122,475 | B2 * | 2/2012 | Osann et al. | 725/82 |
| 2003/0222915 | A1 * | 12/2003 | Marion et al. | 345/769 |
| 2004/0139389 | A1 * | 7/2004 | Sato et al. | 715/500.1 |
| 2008/0195969 | A1 * | 8/2008 | Brown et al. | 715/802 |
| 2009/0083048 | A1 * | 3/2009 | Mandelbaum et al. | 705/1 |
| 2009/0228919 | A1 * | 9/2009 | Zott et al. | 725/34 |
| 2010/0293584 | A1 * | 11/2010 | Civanlar et al. | 725/109 |
| 2012/0166989 | A1 * | 6/2012 | Brown et al. | 715/768 |
| 2012/0233639 | A1 * | 9/2012 | Zott et al. | 725/41 |

\* cited by examiner

*Primary Examiner* — Ebrahim Golabbakhsh
(74) *Attorney, Agent, or Firm* — Christie, Parker & Hale, LLP (57) ABSTRACT

In a method for controlling an electronic device to output electronic content stored in a storage medium thereof via an output module thereof, the electronic device is configured to: display a first object associated with the electronic content and a second object associated with the output module on an operation screen of the electronic device; receive a user input command for establishing an operational relationship between the first and second objects; and automatically retrieve the electronic content from the storage medium, and output the electronic content via the output module in response to the user input command. An electronic device to perform the method is also disclosed.

26 Claims, 8 Drawing Sheets

METHOD FOR CONTROLLING AN ELECTRONIC DEVICE TO OUTPUT ELECTRONIC CONTENT, AND ELECTRONIC DEVICE FOR PERFORMING THE METHOD

CROSS-REFERENCE TO RELATED APPLICATION

This application claims priority of Taiwanese Application No. 09812655, filed on Aug. 5, 2009.

BACKGROUND OF THE INVENTION

1. Field of the Invention

The present invention relates to a method for controlling an electronic device to output electronic content stored therein, more particularly to a method for controlling an electronic device to output electronic content stored therein with minimal user involvement.

2. Description of the Related Art generally, to transfer electronic contents between handheld electronic devices, one would require a certain level of proficiency in operating the electronic devices, including operation of the human-machine interfaces, configuration of the transmission interfaces, and execution of relevant applications. Such requirements may sometimes be challenging in several ways.

Firstly, user selection of electronic contents and interfaces through multiple layers of menu may be a complex procedure. Secondly, user involvement is required in configuring the interfaces. Thirdly, user involvement is required in executing electronic content-specific applications (e.g., word processing applications) for outputting the electronic contents via image output interfaces of the electronic devices to enable projection of the electronic contents on a projector screen or to enable viewing of the electronic contents on a television screen.

SUMMARY OF THE INVENTION

Therefore, an object of the present invention is to provide a method for controlling an electronic device that can alleviate the aforesaid drawbacks of the prior art.

According to one aspect, a method of the present invention is for controlling an electronic device to output electronic content stored in a storage medium thereof via an output module thereof. The method is to be performed by the electronic device, and includes the steps of: a) configuring the electronic device to display a first object associated with the electronic content and a second object associated with the output module on an operation screen of the electronic device; b) configuring the electronic device to receive a user input command for establishing an operational relationship between the first and second objects; and c) configuring the electronic device to automatically retrieve the electronic content from the storage medium, and to output the electronic content via the output module in response to the user input command.

According to another aspect, a method of the present invention is for controlling an electronic device to output electronic content stored in a storage medium thereof. The electronic device includes a plurality of heterogenous output modules independently selected from wireless transmission modules, wired transmission modules, memory interface modules and image output modules. The method is to be performed by the electronic device, and includes the steps of: a) configuring the electronic device to display a first object associated with the electronic content and a plurality of the second objects each associated with a respective one of the output modules, on an operation screen of the electronic device; b) configuring the electronic device to receive a user input command for establishing an operational relationship between the first object and a selected one of the second objects; and c) configuring the electronic device to automatically retrieve the electronic content from the storage medium, and to output the electronic content via the output module associated with the selected one of the second objects in response to the user input command.

Another object of the present invention is to provide an electronic device that performs the aforesaid method of the present invention to thereby alleviate the aforesaid drawbacks of the prior art.

According to yet another aspect, an electronic device of the present invention includes: a storage medium with electronic content stored therein; a display interface for outputting an operation screen of the electronic device; an output module; and a control module coupled to the storage medium, the display interface and the output module, and including an interface-content generator, a command-processing unit, and an operation-processing unit.

The interface-content generator is for generating a first object associated with the electronic content and a second object associated with the output module, wherein the first and second objects are to be displayed on the operation screen. The command-processing unit is for receiving a user input command for establishing an operational relationship between the first and second objects. The operation-processing unit is for automatically retrieving the electronic content from the storage medium, and for outputting the electronic content via the output module in response to the user input command received by the command-processing unit.

According to a further aspect, an electronic device of the present invention includes: a storage medium with electronic content stored therein; a display interface for outputting an operation screen of the electronic device; a plurality of heterogeneous output modules independently selected from wireless transmission modules, wired transmission modules, memory interface modules, and image output modules; and a control module coupled to the storage medium, the display interface and the output modules, and including an interface-content generator, a command-processing unit, and an operation-processing unit.

The interface-content generator is for generating a first object associated with the electronic content, and a plurality of second objects each associated with a respective one of the output modules, wherein the first and second objects are to be displayed on the operation screen. The command-processing unit is for receiving a user input command for establishing an operational relationship between the first object and a selected one of the second objects. The operation-processing unit is for automatically retrieving the electronic content from the storage medium, and for outputting the electronic content via the output module associated with the selected one of the second objects in response to the user input command received by the command-processing unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
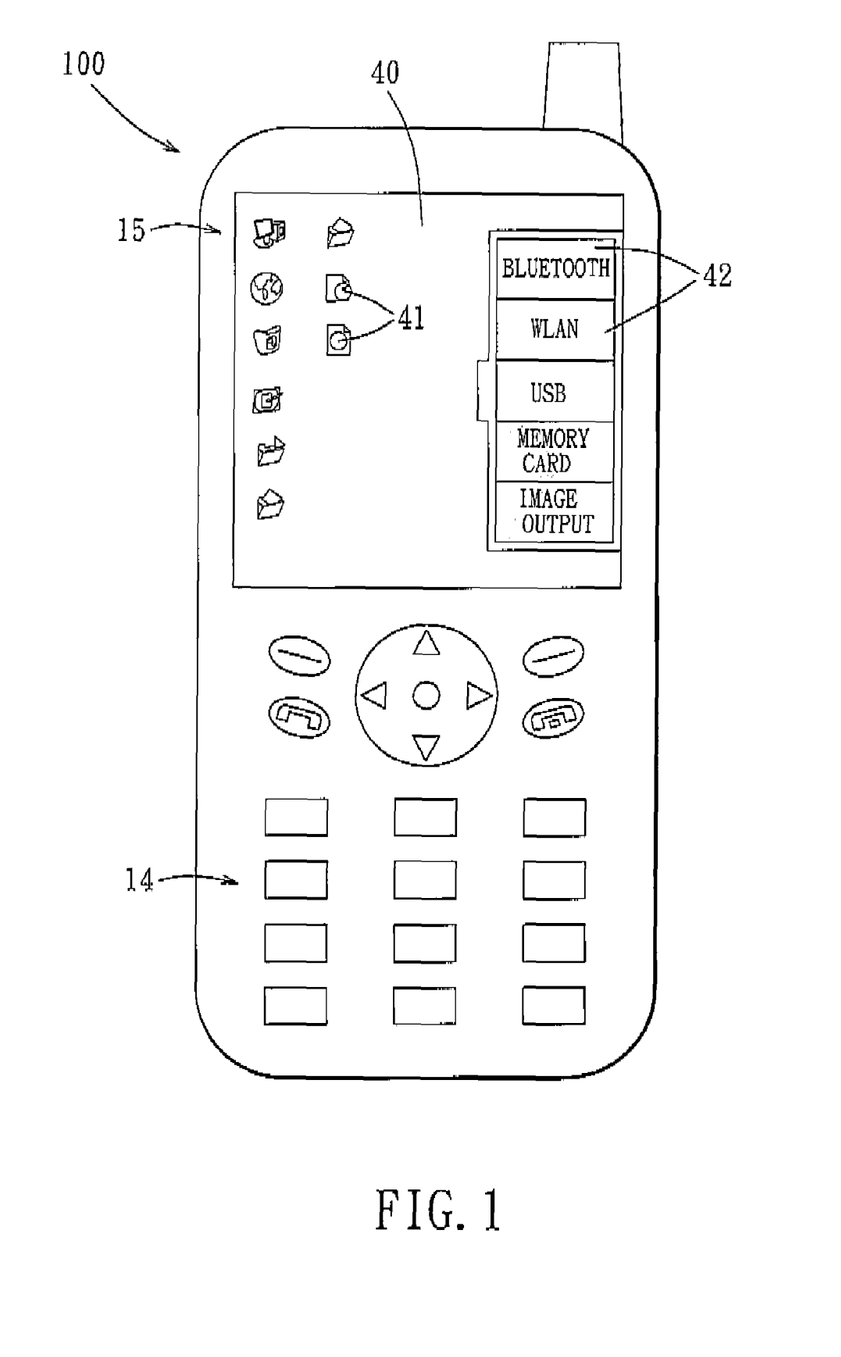
FIG. 1 is a diagram illustrating a plurality of objects associated with respective output modules on an operation screen of the preferred embodiment of an electronic device of the present invention.

Referring to FIG. 1, the preferred embodiment of an electronic device, according to the present invention, is exemplified as a handheld electronic device 100 including a touch screen 15 and a keypad input module 14. The touch screen 15 is adapted for receiving an image signal representative of an operation screen 40 with a plurality of first objects 41 and a plurality of second objects 42 thereon, and for displaying the operation screen 40.

Figure 2:
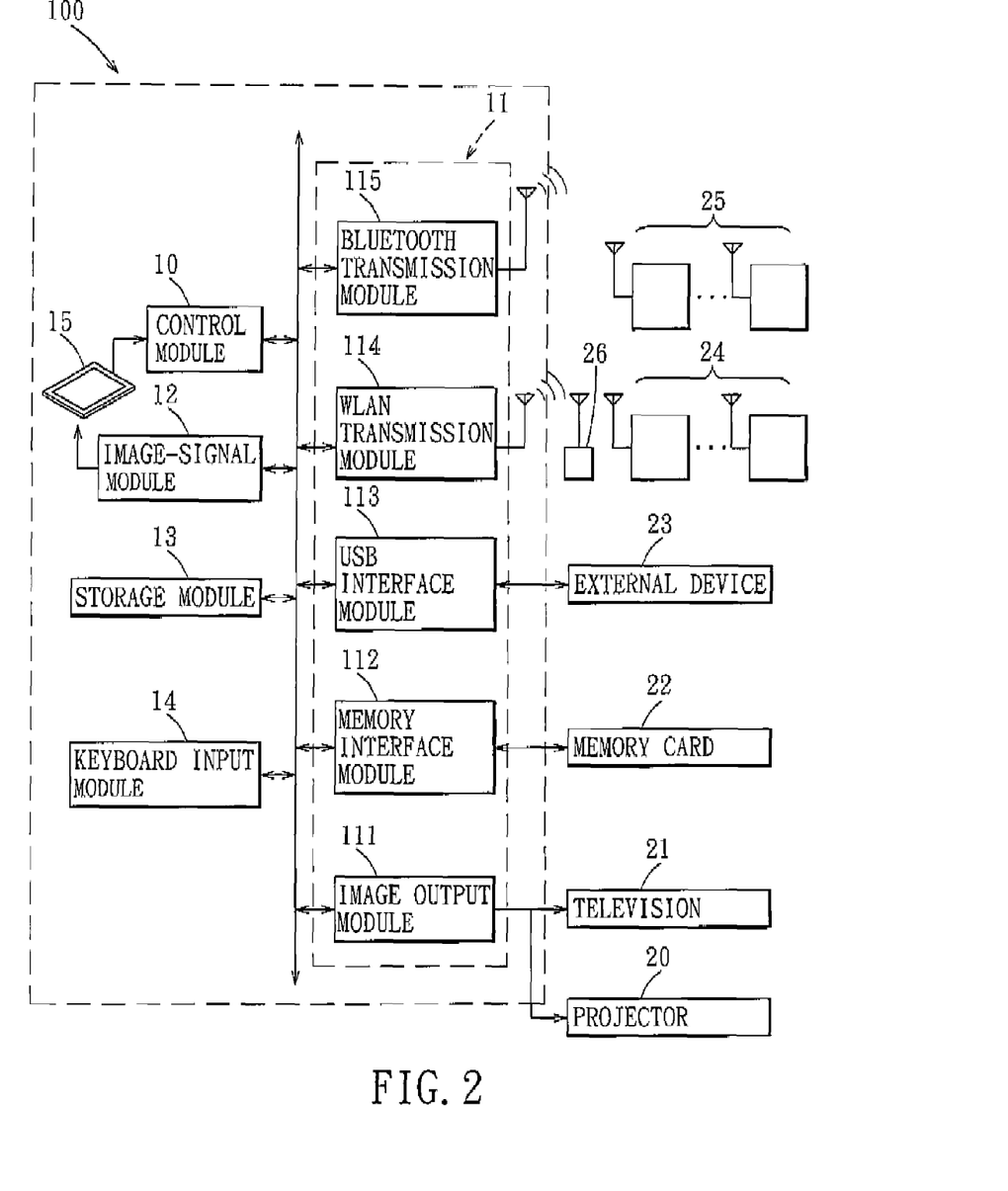
FIG. 2 is a functional block diagram of the electronic device of the preferred embodiment.

Referring to FIG. 2, the electronic device 100 further includes a control module 10, a plurality of output modules 11 also called content transmission hardware components, an image-signal module 12, and a storage medium 13. The image-signal module 12 is for outputting the image signal representative of the operation screen 40 for receipt by the touch screen 15. The storage medium 13 has electronic contents stored therein, each of which is an independent one of an electronic file or an electronic folder, that are associated with the first objects 41, respectively.

Figure 3:
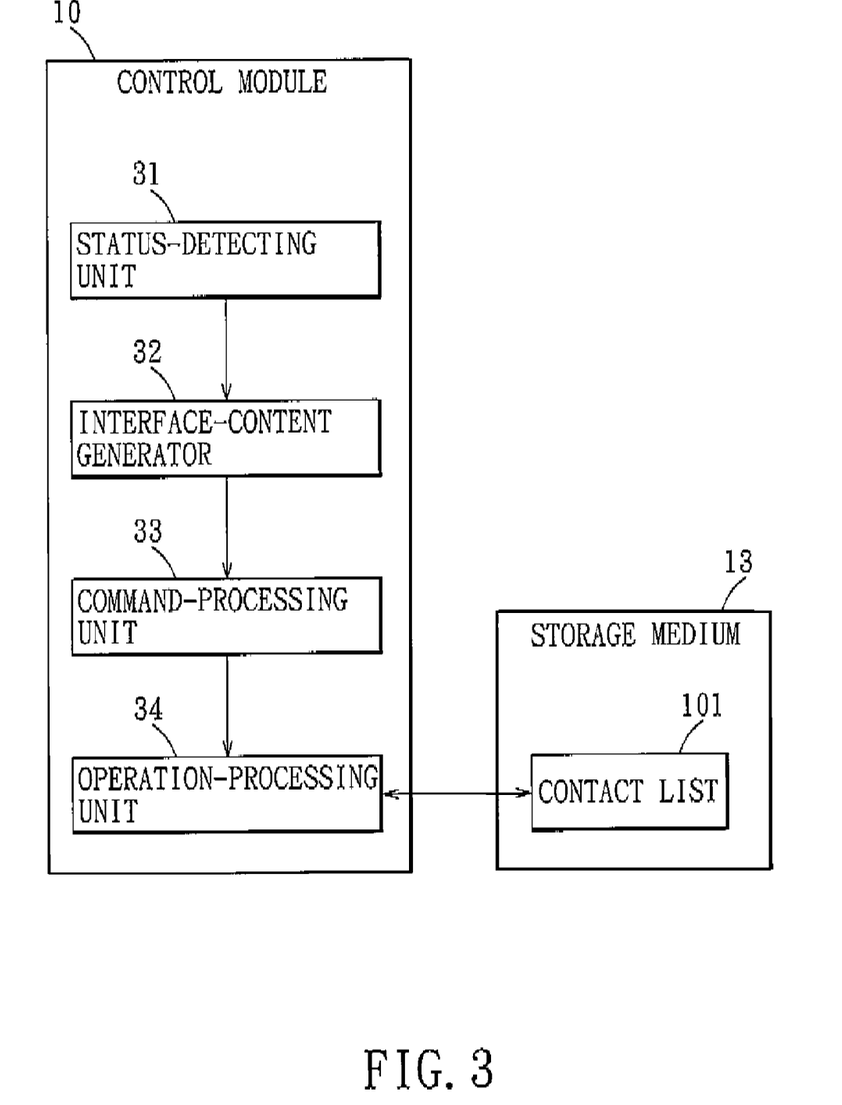
FIG. 3 is a functional block diagram of a control unit and a storage medium of the electronic device of the preferred embodiment.

The control module 10 is adapted for receiving user commands via the keypad input module 14 or via the touch screen 15. However, input of user commands into the electronic device 100 is not limited to such. Referring to FIG. 3, the control module 10 includes a status-detecting unit 31, an interface-content generator 32, a command-processing unit 33, and an operation-processing unit 34.

The status-detecting unit 31 is configured for detecting operational status of each of the output modules 11 according to, for example, a result of calling upon a corresponding one of driver programs associated with the output module 11.

The interface-content generator 32 is configured for generating the first objects 41 to be shown on the operation screen 40, and the second objects 42 to be shown on the operation screen 40 in response to a command for bringing the second objects 42 from a hidden state into a non-hidden state that is received by the command-processing unit 33. The command for bringing the second objects 42 from the hidden state into the non-hidden state is one of a user click command generated as a result of clicking a point within a predetermined area of the operation screen 40, and a drag-and-drop command generated as a result of dragging one of the first objects 41 over the predetermined area of the operational screen 40. In the present embodiment, the predetermined area of the operation screen 40 is for display of a menu window in which the second objects are disposed. Moreover, the interface-content generator 32 may be further configured such that a display attribute of each of the second objects 42 shown on the operation screen 40 indicates the operational status (i.e., availability) of the corresponding one of the output modules 11 as detected by the status-detecting unit 31. For example, a second object 42 may be displayed in a darkened state if the out put module 11 to which the second object 42 corresponds is unavailable for use.

Figure 4:
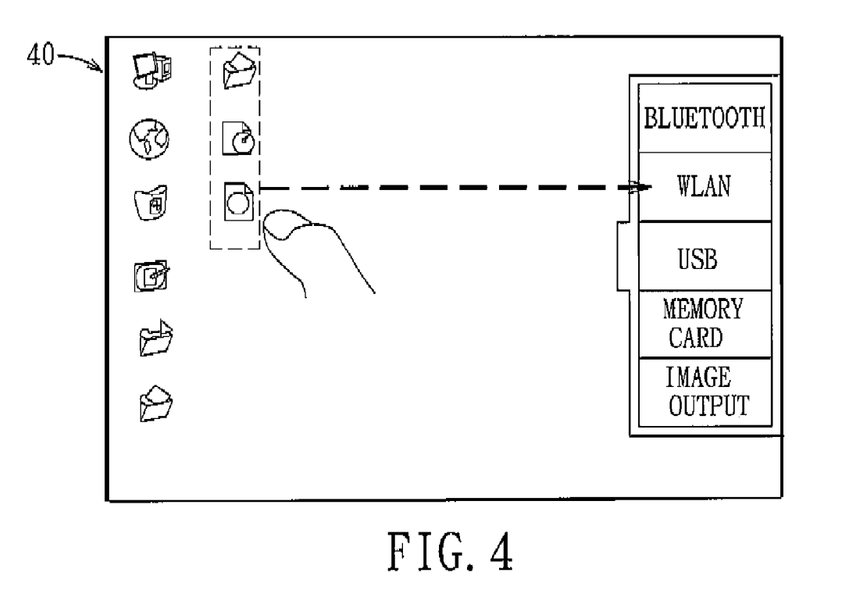
FIGS. 4 and 5 are diagrams illustrating different user input commands for establishing an operational relationship between one of a plurality of objects associated with respective electronic contents and one of the plurality of objects associated with respective output modules.
Figure 5:
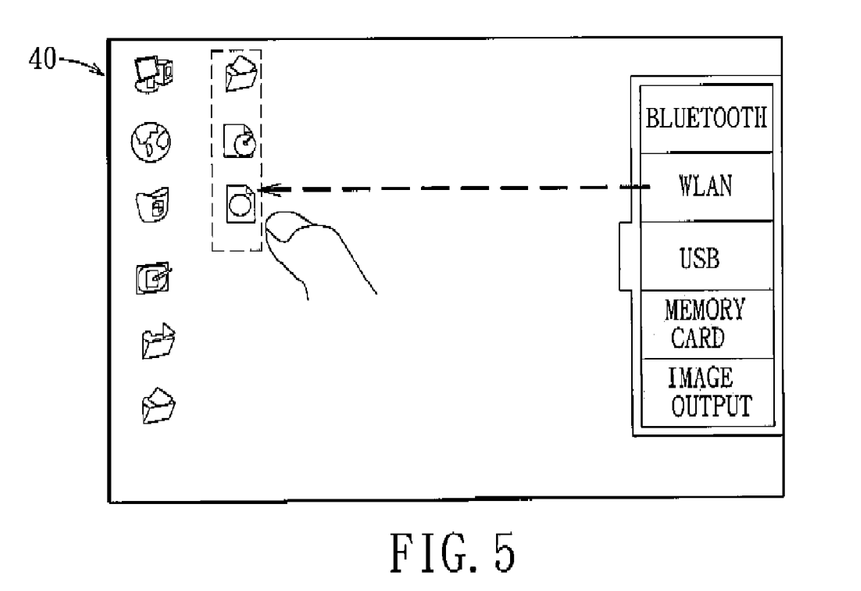

The command-processing unit 33 is adapted for receiving a user input command for establishing an operational relationship between the first and second objects 41, 42. Referring to FIGS. 4 and 5, the user input command is one of a user click command for selecting one of the first objects 41 and one of the second objects 42, and a user drag-and-drop command for dragging the selected one of the first objects 41 toward the selected one of the second objects 42, or vice versa.

In the present embodiment, the operation-processing unit 34 is configured to retrieve the electronic content associated with the selected one of the first objects 41 from the storage medium 13, and to output the electronic content via the output module 11 associated with the selected one of the second objects 42 if selection of the first and second objects 41, 42 is completed within a predetermined duration. It is to be noted that the operation-processing unit 34 may be further configured to show a confirmation window on the operation screen 40 for user confirmation prior to retrieval and output of the electronic content.

In the present embodiment, the output modules 11 include an image output module 111, a memory interface module 112, a wired transmission module 113, a wireless local area network (WLAN) transmission module 114, and a Bluetooth transmission module 115. It is to be noted that, in other embodiments, the output modules 11 may further include other transmission modules, such as an ultra-wideband (UWB) transmission module, and a worldwide-interoperability-for-microwave-access (WiMAX) transmission module.

The memory interface module 112 may be a known card reader module, whereas the wired transmission module 113 may be a known universal serial bus (USB) interface module. Since skilled artisans may readily conceive techniques for storing electronic content in a memory card 22 through a card reader module, and techniques for transmission of electronic content to an external device 23 using a USB interface module, details of the memory interface module 112 and the wired transmission module 113 will be omitted herein for the sake of brevity. Therefore, only operations associated with the Bluetooth transmission module 115, the WLAN transmission module 114 and the image output module 111 will be described in the succeeding paragraphs.

Figure 6:
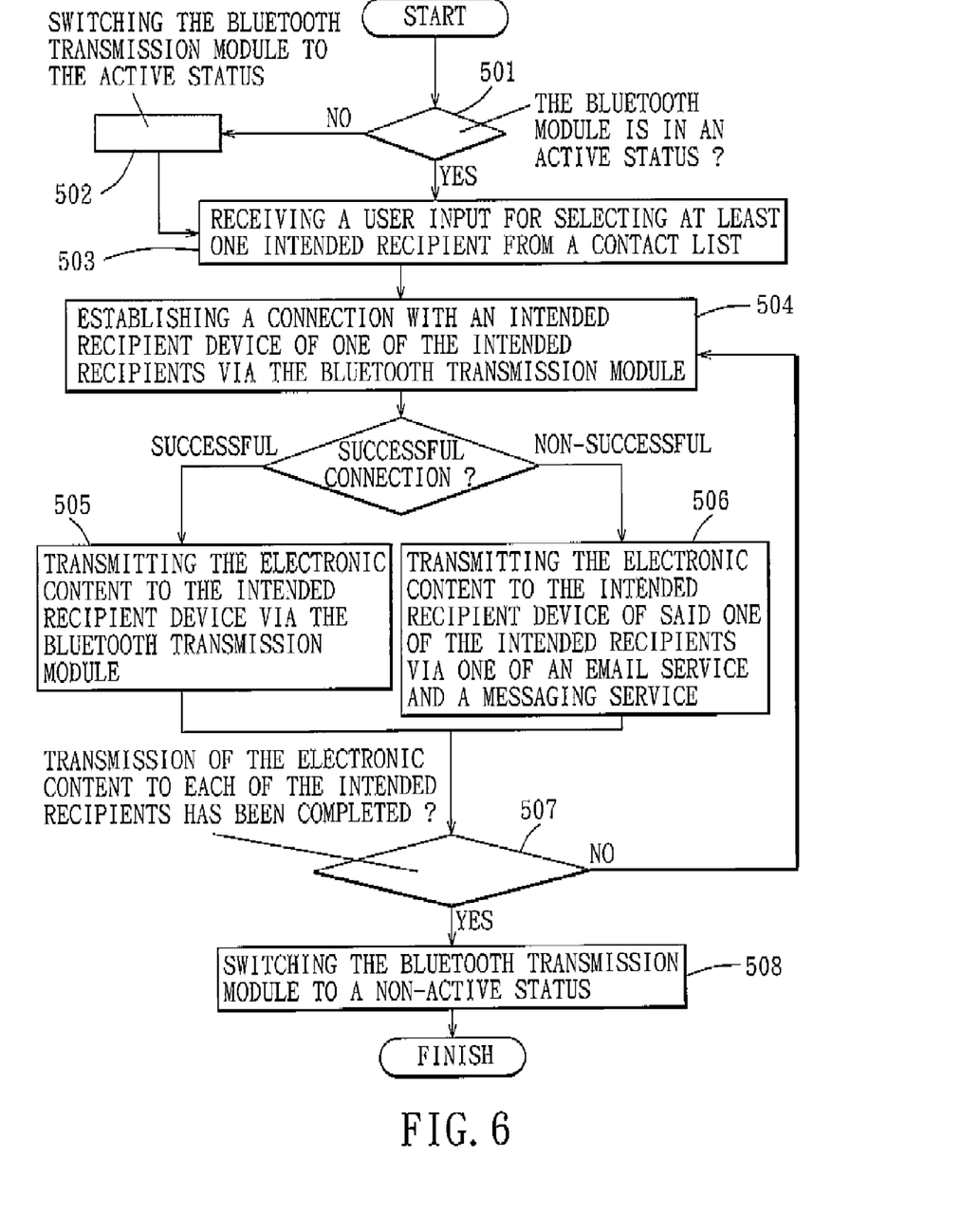
FIG. 6 is a flowchart of an aspect of a method performed by an operation-processing unit of the control unit for transmission of electronic contents to an intended recipient device via a Bluetooth transmission module of the electronic device.

Transmission of Electronic Content Via the Bluetooth Module 115:

Referring to FIG. 6, the operation-processing unit 34 of the preferred embodiment is configured to perform step 501 to step 508 for transmission of the electronic content to an intended recipient device 25 (see FIG. 2) via the Bluetooth transmission module 115.

In step 501, the operation-processing unit 34 is configured to determine whether the Bluetooth transmission module 115 is to be switched from a non-active status to an active status for enabling output of the electronic contents via the Bluetooth transmission module 115, to proceed to step 502 if affirmative, and to proceed to step 503 if otherwise. In step 502, the operation-processing unit 34 is configured to switch the Bluetooth transmission module 115 from the non-active status to the active status, and to proceed to step 503 thereafter.

In step 503, the operation-processing unit 34 is configured to retrieve a contact list 101 (see FIG. 3) from the storage medium 13, to show the contact list 101 on the operation screen 40, to receive a user input command for selecting at least one intended recipient from the contact list 101, and to proceed to step 504 thereafter. The contact list 101 contains contact information such as names, telephone numbers, identification codes, connection parameters (e.g., encryption keys, encryption mode, web address, etc.) of electronic devices, and electronic mail (email) addresses. Those skilled in the art may readily appreciate that, if an intended recipient is not in the contact list 101, step 503 may include sub-steps for setting up a new contact in the contact list 101.

In step 504, the operation-processing unit 34 is configured to establish a connection with an intended recipient device of one of the intended recipients via the Bluetooth transmission module 115 with reference to the contact information, to proceed to step 505 if the connection can be established, and to proceed to step 506 if otherwise. Since those skilled in the art may readily appreciate the protocols involved in the establishment of a Bluetooth connection between two devices, further details of the same will be omitted herein for the sake of brevity.

In step 505, the operation-processing unit 34 is configured to transmit the electronic content to the intended recipient device via the Bluetooth transmission module 115, and to proceed to step 507 thereafter.

In step 506, the operation-processing unit 34 is configured to transmit the electronic content to the intended recipient device of said one of the intended recipients via one of an email service and a messaging service with reference to the contact information, and to proceed to step 507 thereafter.

In particular, email transmission may be conducted using the WLAN transmission module 114, whereas messaging transmission may be conducted using a GSM transmission module (not shown) of the electronic device 100. Since those skilled in the art may readily appreciate the techniques involved in email transmission and messaging transmission, further details of the same are omitted herein for the sake of brevity.

In step 507, the operation-processing unit 34 is configured to determine whether transmission of the electronic content to each of the intended recipients has been completed, to proceed to step 508 if affirmative, and to proceed to step 504 it otherwise so as to transmit the electronic content to another one of the intended recipients. In step 508, which is an optional step, the operation-processing unit 34 is configured to switch the Bluetooth transmission module 115 to the non-active status to save power.

Figure 7:
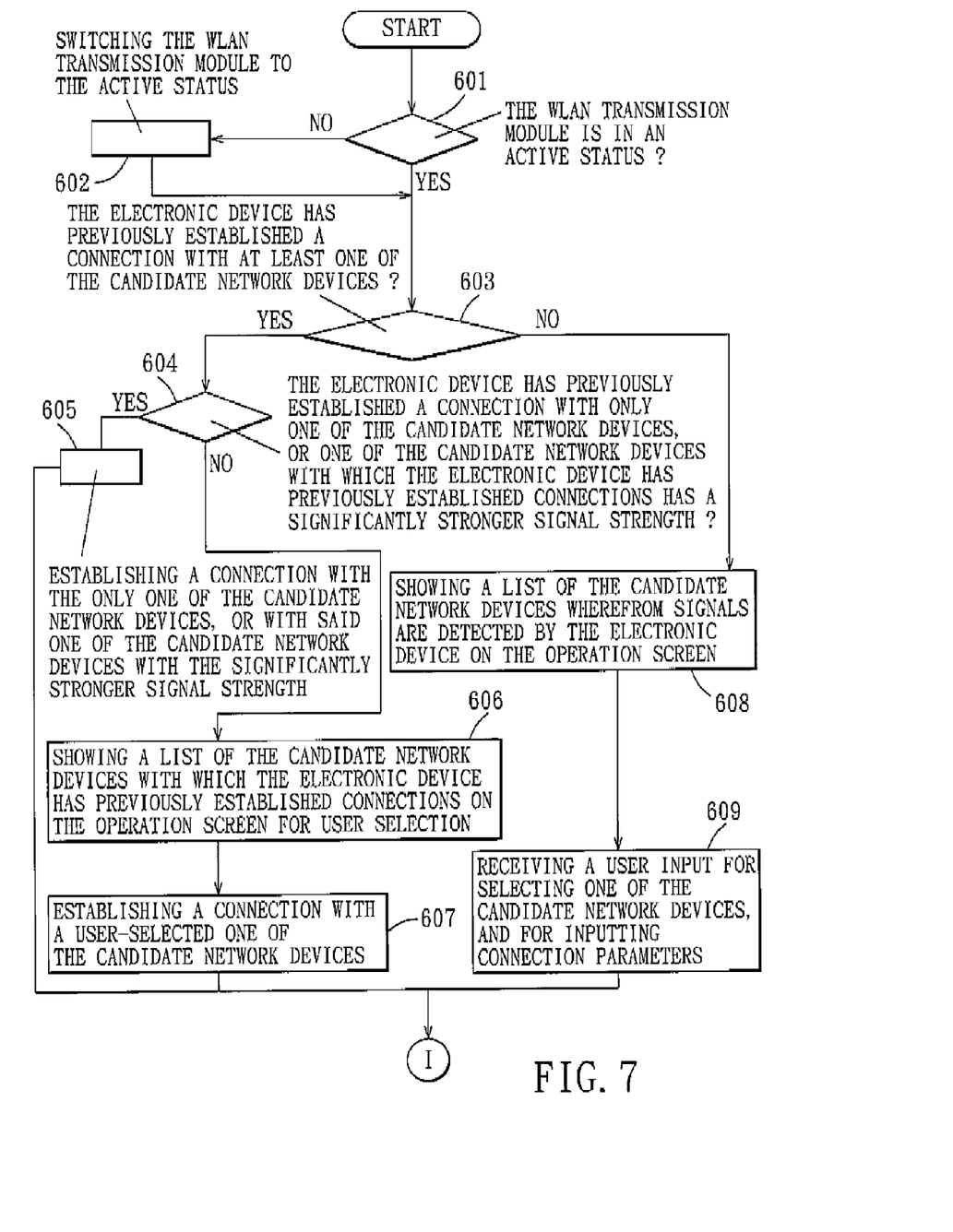
FIGS. 7 and 8 are first and second parts of a flowchart of another aspect of the method performed by the operation-processing unit for transmission of electronic contents to an intended recipient device via a wireless local area network (WLAN)transmission module of the electronic device.
Figure 8:
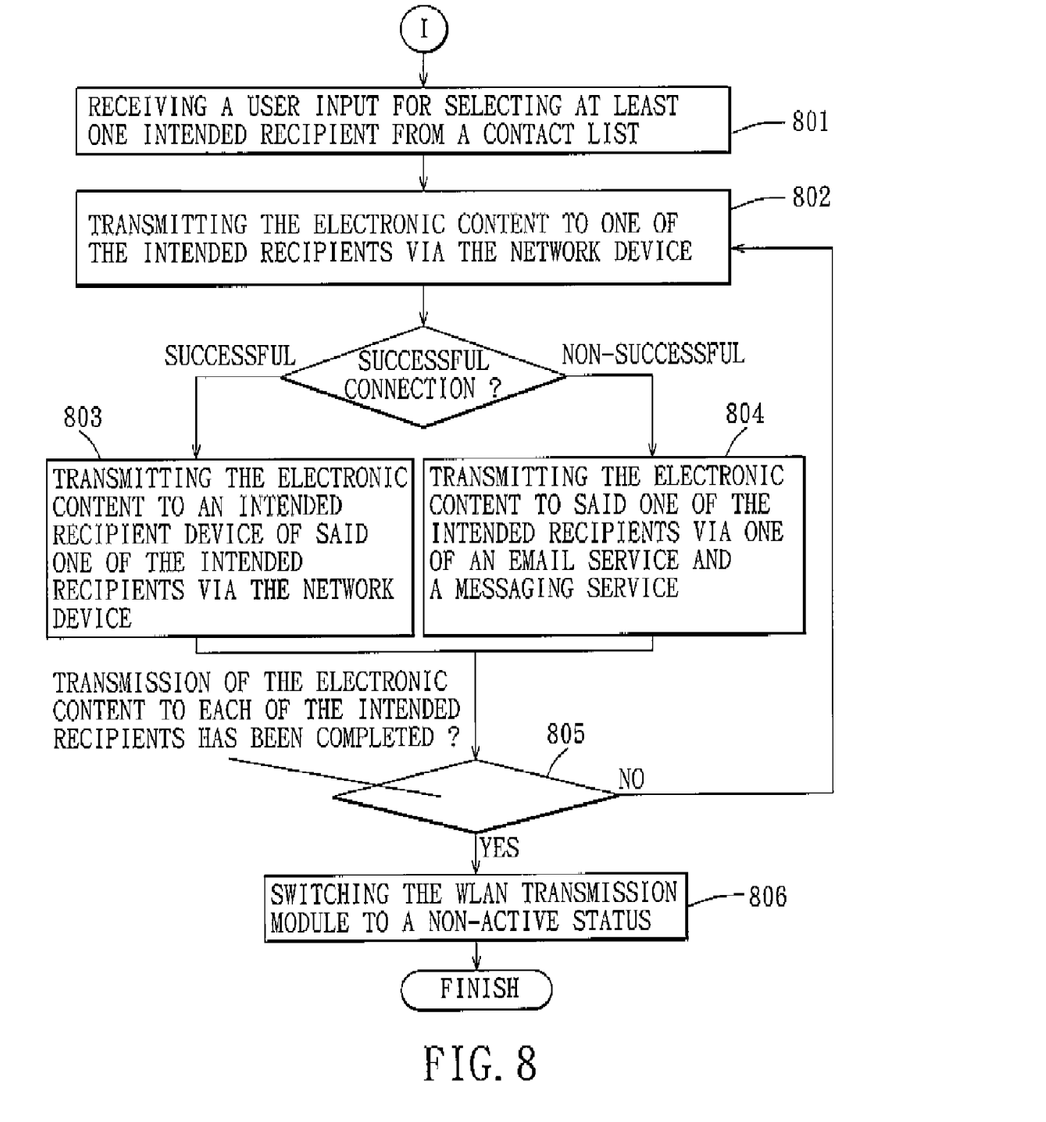

Transmission of Electronic Content Via the WLAN Transmission Module 114:

Referring to FIGS. 7 and 8, the operation-processing unit 34 of the preferred embodiment is configured to perform step 601 to step 609 for choosing a network device 26 (see FIG. 2) from a plurality of candidate network devices and for establishing a connection therewith. In the present embodiment, the network devices 26 are WLAN access points (AP). Once the connection is established, the operation-processing unit 34 is further configured to perform step 801 to step 806 for transmitting the electronic content to an intended recipient via the selected network device 26.

In step 601, the operation-processing unit 34 is configured to determine whether the WLAN transmission module 114 is to be switched from a non-active status to an active status, to proceed to step 602 if affirmative, and to proceed to step 603 if otherwise. In step 602, the operation-processing unit 39 is configured to switch the WLAN transmission module 114 from the non-active status to the active status, and to proceed to step 605 thereafter.

In step 603, the operation-processing unit 34 is configured to determine whether the electronic device 100 has previously established a connection with at least one of the candidate network devices 26, to proceed to step 604 if affirmative, and to proceed to step 60B if otherwise.

In step 604, the operation-processing unit 34 is configured to proceed to stop 605 if it determines that the electronic device 100 has previously established a connection with only one of the candidate network devices 26, to proceed to step 605 if one of the candidate network devices 26 with which the electronic device 100 has previously established connections has a significantly stronger signal strength, as detected by the electronic device 100, and to proceed to step 606 if otherwise.

In step 605, the operation-processing unit 34 is configured to establish a connection with the only one of the candidate network devices 26, or with said one of the candidate network devices 26 with the significantly stronger signal strength, and to proceed to step 801 thereafter. Since the feature of the present invention does not reside in the protocol behind establishment of the connection between the electronic device 100 and the candidate network device 26, which is known in the art, further details of the same will be omitted herein for the sake of brevity.

In step 606, the operation-processing unit 34 is configured to show a list of the candidate network devices 26 with which the electronic device 100 has previously established connections on the operation screen 40 for user selection, and to proceed to step 607 thereafter. The candidate network devices 26 are shown in a descending order of signal strength in the list. In step 607, the operation-processing unit 34 is configured to establish a connection with one of the candidate network devices 26 in response to a user input command for selecting said one of the candidate network devices 26 from the list, and to proceed to step 801 thereafter.

In step 608, the operation-processing unit 34 is configured to show a list of the candidate network devices 26 wherefrom signals are detected by the electronic device 100 on the operation screen 40, and to proceed to step 609. The candidate network devices 26 are shown in a descending order of signal strength in the list. In step 609, the operation-processing unit 34 is configured to receive a user input command for selecting one of the candidate network devices 26 from the list, to receive a user input command for inputting connection parameters (e.g., encryption key) that are required for establishing a connection with the selected one of the candidate network devices 26, to establish a connection with the selected one of the candidate network devices 26, and to proceed to step 801 thereafter.

Transmission of the electronic content to the intended recipient via the network device 26 is conducted only after the electronic device 100 has successfully established a connection with the network device 26.

In step 801, the operation-processing unit 34 is configured to retrieve the contact list 101 from the storage medium 13, to show the contact list 101 on the operation screen 40, to receive a user input command for selecting at least one intended recipient from the contact list 101, and to proceed to step 802 thereafter. If an intended recipient is not in the contact list 101, step 801 may include sub-steps for setting up a new contact in the contact list 101.

In step 802, the operation-processing unit 34 is configured to transmit the electronic content to one of the intended recipients via the network device 26 with reference to the contact information, to proceed to step 803 if the connection can be established, and to proceed to step 804 if otherwise. Those skilled in the art may readily appreciate that connection between devices via the network device 26 may be established through dynamic domain name system (DDNS) techniques to eliminate the need of obtaining internet protocol (IF) address of each electronic device that is assigned with a dynamic IP address prior to transmission of the electronic content.

In step 803, the operation-processing unit 34 is configured to transmit the electronic content to an intended recipient device 24 (see FIG. 2) of said one of the intended recipients via the network device 26, and to proceed to step 805 thereafter.

In step 804, the operation-processing unit 34 is configured to transmit the electronic content to said one of the intended recipients via one of an email service and a messaging service with reference to the contact information, and to proceed to step 805 thereafter.

In step 805, the operation-processing unit 34 is configured to determine whether transmission of the electronic content to each of the intended recipients has been completed, to proceed to step 806 if affirmative, and to proceed to step 802 if otherwise so as to transmit the electronic content to another one of the intended recipients. In step 806, which is an optional step, the operation-processing unit 34 is configured to switch the WLAN transmission module 114 to the non-active status to save power.

Output of Electronic Content Via the Image Output Module 111

Figure 9:
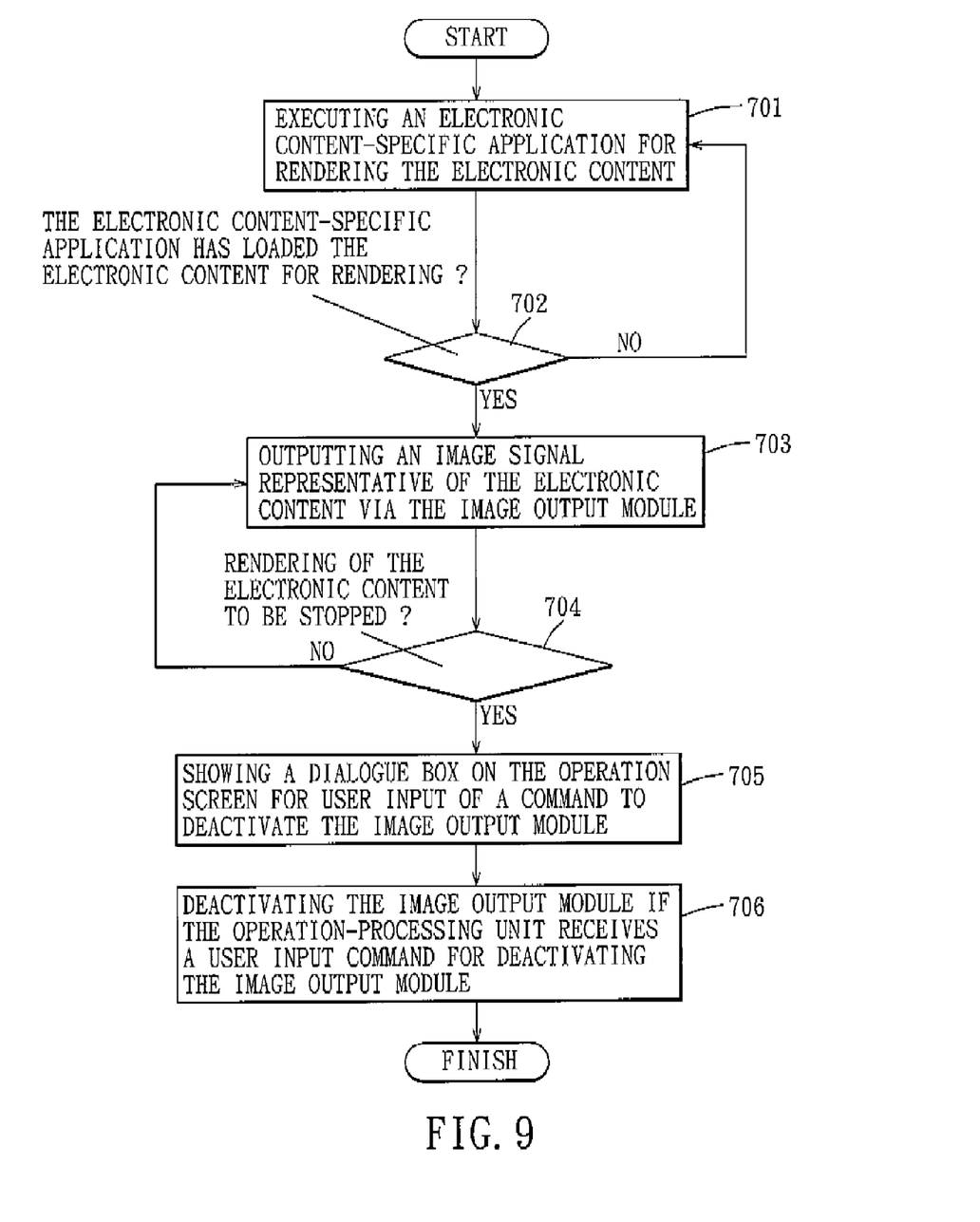
FIG. 9 is a flowchart of yet another aspect of the method performed by the operation-processing unit for output of electronic contents via an image output module of the electronic device.

Referring to FIG. 9, the operation-processing unit 34 is configured to perform step 701 to step 706 for outputting the electronic content via the image output module 111 for receipt by an image projector 20 or a television set 21 (see FIG. 2).

In step 701, the operation-processing unit 34 is configured to execute an electronic content-specific application (such as a word processing application) for rendering the electronic content (such as a document file), and to proceed to step 702 thereafter.

In step 702, the operation-processing unit 34 is configured to determine whether the electronic content-specific application has loaded the electronic content for rendering, and to proceed to step 703 thereafter.

In step 703, the operation-processing unit 34 is configured to output an image signal representative of the electronic content, as rendered by the electronic content-specific application, via the image output module 111, and to proceed to step 704 thereafter.

In step 704, the operation-processing unit 34 is configured to determine whether rendering of the electronic content is to be stopped (such as when a command for closing the electronic content is received), and to proceed to step 705 if affirmative.

In step 705, the operation-processing unit 34 is configured to show a dialogue box on the operation screen 40 for user input of a command to deactivate the image output module 111, and to proceed to step 706 thereafter.

In step 706, the operation-processing unit 34 is configured to deactivate the image output module 111 if the operation-processing unit 34 receives a user input command for deactivating the image output module 111.

In summary, the electronic device 100 of the preferred embodiment of the present invention and the method performed thereby have several advantages. Firstly, user selection of electronic contents and interfaces can be performed without requiring a user to select different options through multiple layers of menu. Secondly, operational status of each of the interfaces may be readily shown by different display-related attributes of the second objects 42. Thirdly, automatic execution of electronic content-specific application may further reduce user involvement.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for controlling an electronic device to output electronic content stored in a storage medium thereof via content transmission hardware component thereof, the storage medium having contact information of an owner of an intended recipient device stored thereon, said method to be performed by the electronic device and comprising the steps of:
   a) configuring the electronic device to display a first object associated with the electronic content and a second object that contains visible information associated with the content transmission hardware component on an operation screen of the electronic device;
   b) configuring the electronic device to receive a user input command for establishing an operational relationship between the first and second objects;
   c) configuring the electronic device to automatically retrieve the electronic content from the storage medium, and to output the electronic content via the content transmission hardware component in response to the user input command; and
   d) configuring the electronic device to transmit the electronic content to the owner of the intended recipient device via one of an electronic mail service and a messaging service with reference to the contact information if a connection with the intended recipient device cannot be established via a wireless transmission module.

2. The method as claimed in claim 1, wherein, in step a), the electronic device is configured to show the second object on the operation screen in response to a command for bringing the second object from a hidden state into a non-hidden state.

3. The method as claimed in claim 2, wherein the command for bringing the second object from the hidden state into the non-hidden state is one of a user click command generated as a result of clicking a point within a predetermined area of the operation screen, and a drag-and-drop command generated as a result of dragging the first object over the predetermined area of the operation screen.

4. The method as claimed in claim 1, wherein, in step b), the user input command is one of a user click command for selecting the first and second objects, and a user drag-and-drop command for dragging one of the first and second objects toward an other one of the first and second objects.

5. The method as claimed in claim 4, wherein, in step b), the user input command is the user click command for selecting the first and second objects, and in step c), the electronic device is configured to retrieve the electronic content from the storage medium and to output the electronic content via the content transmission hardware component if selection of the first and second objects is completed within a predetermined duration in step b).

6. The method as claimed in claim 4, wherein, in step b), the user input command is the user drag-and-drop command for dragging one of the first and second objects toward the other one of the first and second objects, and in step c), the electronic device is configured to retrieve the electronic content from the storage medium and to output the electronic content via the content transmission hardware component if dragging and dropping of said one of the first and second objects toward the other one of the first and second objects is completed within a predetermined duration in step b).

7. The method as claimed in claim 1, wherein step c) includes configuring the electronic device to determine whether the content transmission hardware component is to be switched from a non-active status to an active status for enabling outputting of the electronic content through the content transmission hardware component, and to switch the content transmission hardware component from the non-active status to the active status prior to outputting the electronic content through the content transmission hardware component if result of determination made thereby is affirmative.

8. The method as claimed in claim 7, wherein step c) further includes configuring the electronic device to switch the content transmission hardware component to the non-active status after outputting the electronic content through the content transmission hardware component.

9. The method as claimed in claim 7, the content transmission hardware component being a wireless transmission module, wherein:
in step c), the wireless transmission module is enabled to establish a connection with an intended recipient device, and to transmit the electronic content to the intended recipient device when the wireless transmission module is switched to the active status.

10. The method as claimed in claim 9, wherein:
in step c), the wireless transmission module is enabled to establish the connection with the intended recipient device via a network device, and to transmit the electronic content to the intended recipient device via the network device when the wireless transmission module is switched to the active status.

11. The method as claimed in claim 1, the content transmission hardware component being an image content transmission hardware component, wherein:
in step c), the electronic device is configured to execute an electronic content-specific application for rendering the electronic content, and to output an image signal representative of the electronic content, as rendered by the electronic content-specific application, via the image content transmission hardware component.

12. A method for controlling an electronic device to output electronic content stored in a storage medium thereof, the electronic device including a plurality of heterogeneous content transmission hardware components independently selected from wireless transmission modules, wired transmission modules, memory interface modules and image output modules, and the storage medium of the electronic device having contact information of an owner of an intended recipient device stored thereon, said method to be performed by the electronic device and comprising the steps of:
a) configuring the electronic device to display a first object associated with the electronic content and a plurality of second objects, each containing visible information indicating a respective one of the content transmission hardware components, on an operation screen of the electronic device;
b) configuring the electronic device to receive a user input command for establishing an operational relationship between the first object and a selected one of the second objects;
c) configuring the electronic device to automatically retrieve the electronic content from the storage medium, and to output the electronic content via the content transmission hardware component associated with the selected one of the second objects in response to the user input command; and
d) configuring the electronic device to transmit the electronic content to the owner of the intended recipient device via one of an electronic mail service and a messaging service with reference to the contact information if a connection with the intended recipient device cannot be established via the wireless transmission modules.

13. An electronic device comprising:
a storage medium with electronic content stored therein;
a display interface for outputting an operation screen of the electronic device;
a content transmission hardware component; and
a control module coupled to said storage medium, said display interface and said content transmission hardware component, and including
an interface-content generator for generating a first object associated with the electronic content and a second object that contains visible information associated with said content transmission hardware component, the first and second objects to be displayed on said operation screen,
a command-processing unit for receiving a user input command for establishing an operational relationship between the first and second objects, and
an operation-processing unit for automatically retrieving the electronic content from said storage medium, and for outputting the electronic content via said content transmission hardware component in response to the user input command received by said command-processing unit, wherein said storage medium has contact information of an owner of an intended recipient device stored therein, and said operation-processing unit being configured to transmit the electronic content to the owner of the intended recipient device via one of an electronic mail service and a messaging service with reference to the contact information if a connection with the intended recipient device cannot be established.

14. The electronic device as claimed in claim 13, wherein said interface-content generator is configured to enable showing of the second object on said operation screen in response to a command for bringing the second object from a hidden state into a non-hidden state that is received by said command-processing unit.

15. The electronic device as claimed in claim 14, wherein the command for bringing the second object from the hidden state into the non-hidden state that is received by said command-processing unit is one of a user click command generated as a result of clicking a point within a predetermined area of said operation screen, and a drag-and-drop command generated as a result of dragging the first object over the predetermined area of said operation screen.

16. The electronic device as claimed in claim 13, wherein the user input command is one of a user click command for selecting the first and second objects, and a user drag-anddrop command for dragging one of the first and second objects toward an other one of the first and second objects.

17. The electronic device as claimed in claim 16, wherein the user input command is the user click command for selecting the first and second objects, and said operation-processing unit is configured to retrieve the electronic content from said storage medium and to output the electronic content via said content transmission hardware component if selection of the first and second objects is completed within a predetermined duration.

18. The electronic device as claimed in claim 16, wherein the user input command is the user drag-and-drop command for dragging one of the first and second objects toward the other one of the first and second objects, and said operation-processing unit is configured to retrieve the electronic content from said storage medium and to output the electronic content via said content transmission hardware component if dragging and dropping of said one of the first and second objects toward the other one of the first and second objects is completed within a predetermined duration.

19. The electronic device as claimed in claim 13, wherein said operation-processing unit is configured to determine whether said content transmission hardware component is to be switched from a non-active status to an active status for enabling outputting of the electronic content via said content transmission hardware component, and to switch said content transmission hardware component from the non-active status to the active status prior to outputting the electronic content via said content transmission hardware component if result of determination made thereby is affirmative.

20. The electronic device as claimed in claim 19, wherein said operation-processing unit is further configured to switch said content transmission hardware component to the non-active status after outputting the electronic content via said content transmission hardware component.

21. The electronic device as claimed in claim 19, wherein said content transmission hardware component is a wireless transmission module, said wireless transmission module being enabled to establish a connection with an intended recipient device and to transmit the electronic content to the intended recipient device when said wireless transmission module is switched to the active status.

22. The electronic device as claimed in claim 21, wherein said wireless transmission module is enabled to establish the connection with the intended recipient device via a network device, and to transmit the electronic content to the network device when said wireless transmission module is switched to the active status.

23. The electronic device as claimed in claim 21, wherein said wireless transmission module is one of a Bluetooth transmission module, a wireless local area network transmission module, an ultra-wideband transmission module, and a worldwide interoperability for microwave access transmission module.

24. The electronic device as claimed in claim 13, wherein said content transmission hardware component is an image output module, and said operation-processing unit is configured to execute an electronic content-specific application for rendering the electronic content, and to output an image signal representative of the electronic content, as rendered by the electronic content-specific application, via said image output module.

25. An electronic device comprising:
 a storage medium with electronic content stored therein;
 a display interface for outputting an operation screen of the electronic device;
 a plurality of heterogeneous content transmission hardware components independently selected from wireless transmission modules, wired transmission modules, memory interface modules, and image output modules; and
 a control module coupled to said storage medium, said display interface and said content transmission hardware components, and including
  an interface-content generator for generating a first object associated with the electronic content, and a plurality of second objects each containing visible information associated with a respective one of said content transmission hardware components, the first and second objects to be displayed on said operation screen,
  a command-processing unit for receiving a user input command for establishing an operational relationship between the first object and a selected one of the second objects, and
  an operation-processing unit for automatically retrieving the electronic content from said storage medium, and for outputting the electronic content via one of said content transmission hardware components that is associated with the selected one of the second objects in response to the user input command received by said command-processing unit,
 wherein said storage medium has contact information of an owner of an intended recipient device stored therein, and said operation-processing unit being configured to transmit the electronic content to the owner of the intended recipient device via one of an electronic mail service and a messaging service with reference to the contact information if a connection with the intended recipient device cannot be established.

26. The electronic device as claimed in claim 13, wherein said control module further includes a status-detecting unit for detecting operational status of said content transmission hardware component, the second object displayed on said operation screen having a display attribute corresponding to the operational status of said content transmission hardware component as detected by said status-detecting unit.

* * * * *